(12) United States Patent
Bailey et al.

(10) Patent No.: US 8,361,254 B2
(45) Date of Patent: Jan. 29, 2013

(54) STEEL COMPOSITIONS, METHODS OF FORMING THE SAME, AND ARTICLES FORMED THEREFROM

(75) Inventors: Ronald E. Bailey, Pittsburgh, PA (US); Thomas R. Parayil, New Kensington, PA (US); Timothy M. Hackett, Upper St. Clair, PA (US); Tong C. Lee, Murrysville, PA (US)

(73) Assignee: ATI Properties, Inc., Albany, OR (US)

( * ) Notice: Subject to any disclaimer, the term of this patent is extended or adjusted under 35 U.S.C. 154(b) by 0 days.

(21) Appl. No.: 13/155,629

(22) Filed: Jun. 8, 2011

(65) Prior Publication Data
US 2011/0236721 A1    Sep. 29, 2011

Related U.S. Application Data

(63) Continuation of application No. 11/511,554, filed on Aug. 29, 2006, now Pat. No. 7,981,521.

(60) Provisional application No. 60/712,587, filed on Aug. 30, 2005.

(51) Int. Cl.
| | |
|---|---|
| *F41H 5/00* | (2006.01) |
| *F41H 5/04* | (2006.01) |
| *B22F 7/04* | (2006.01) |
| *B23K 31/00* | (2006.01) |
| *C21D 1/26* | (2006.01) |
| *C21D 1/18* | (2006.01) |
| *C21D 9/46* | (2006.01) |

(52) U.S. Cl. ........ 148/529; 148/527; 148/622; 148/546; 148/547; 148/548; 228/158; 228/234.1; 228/235.2; 228/235.3; 228/262.41; 419/8; 419/66

(58) Field of Classification Search ................. None
See application file for complete search history.

(56) References Cited

U.S. PATENT DOCUMENTS 3,785,801 A * 1/1974 Benjamin ................. 75/255
4,941,927 A * 7/1990 Hickey et al. ............ 29/527.7

FOREIGN PATENT DOCUMENTS

| JP | 57-41351 A | 3/1982 |
| JP | 59-47363 A | 3/1984 |

OTHER PUBLICATIONS

Technical data sheet entitled "K12 Dual Hardness Armor Plate", Allegheny Ludlum, An Allegheny Technologies Company (2002) 4pp.*

* cited by examiner

*Primary Examiner* — Aaron Austin
(74) *Attorney, Agent, or Firm* — K & L Gates LLP; Patrick J. Viccaro; John E. Grosselin, III

(57) ABSTRACT

Maraging steel compositions, methods of forming the same, and articles formed therefrom comprising, by weight, 15.0 to 20.0% Ni, 2.0 to 6.0% Mo, 3.0 to 8.0% Ti, up to 0.5% Al, the balance Fe and residual impurities. The composition may be a first layer of a composite plate, and may have a second layer deposited on the first layer, the second layer having a composition comprising, by weight, 15.0 to 20.0% Ni, 2.0 to 6.0% Mo, 1.0 to 3.0 Ti, up to 0.5% Al, the balance Fe and residual impurities. The first layer may have a hardness value ranging from 58 to 64 RC, and the second layer may have a hardness value ranging from 48 to 54 RC. The first layer may be formed employing powdered metallurgical techniques. Articles formed from the compositions include armored plate.

32 Claims, No Drawings

STEEL COMPOSITIONS, METHODS OF FORMING THE SAME, AND ARTICLES FORMED THEREFROM

CROSS-REFERENCE TO RELATED APPLICATIONS

This application is a continuation application and claims the benefit of the filing date of co-pending U.S. patent application Ser. No. 11/511,554, filed Aug. 29, 2006, which claims the benefit of the filing date of U.S. Provisional Patent Application Ser. No. 60/712,587, filed Aug. 30, 2005. U.S. patent application Ser. No. 11/511,554 and U.S. Provisional Patent Application Ser. No. 60/712,587 are incorporated by reference herein.

TECHNICAL FIELD

The present invention relates to methods of forming steel compositions, steel compositions produced therefrom, and articles formed from the compositions.

BACKGROUND

Maraging steel is a type of high-strength, low-carbon martensitic steel which contains relatively high amounts of nickel and in which hardening precipitates are formed by aging. Due, in part, to its exceptional mechanical properties, such as high tensile strength, maraging steel has been employed in various commercial and military applications. Commercial applications include, for example, aircraft forgings. Certain maraging steels have also been found to possess particularly good properties for military applications, such as for use in armor plate, and have been shown to exhibit good resistance to penetration by projectiles.

Historically, armor plate has been produced from various materials, including ceramics, metals, such as steel and aluminum, as well as composites of metals. Recently, improvements in armor plate have provided have a lighter-weight armor plate having greater ballistic protection. In this regard, maraging steel has been shown to provide certain advantages over various traditional forms of armor plate material.

Various compositions and methods of forming maraging steel for use in armor plate have been employed that are said to provide improved properties and resistance to penetration by projectiles. The hard front side of the armor plate is designed to break up or flatten the projectile, while the softer back side captures the projectile. For example, a dual hardness armor plate, commercially available as K12® from Allegheny Ludlum, Washington, Pa. is based on a Ni—Mo—Cr alloy steel that consists of a relatively high hardness front side and a softer back side. The assembly is roll bonded by a multi-step process that involves heating to a specific temperature and hot rolling until the two sides form a strong, metallurgical bond. The roll-bonded plates are then annealed, sheared, and flattened.

In another armor plate assembly and formation process, a composite plate of maraging steel includes a hard outer layer and a tenacious inner layer. The steel of the inner layer is produced in a process employing a chemical composition containing in percent by weight: $C \leq 0.01$, $Si \leq 0.1$, $Mn \leq 0.1$, $P \leq 0.005$, $S \leq 0.005$, $Cu \leq 0.1$, Mo is 4.80 to 5.20, Ni is 17.5 to 18.5, $Cr \leq 0.1$, Ti is 0.55 to 0.70, Co is 8.0 to 9.0. The steel of the outer layer is produced with purification in a process with a chemical composition containing in percent by weight: $C \leq 0.01$, $Si < 0.1$, Mn is 0.02 to 0.20, $P \leq 0.005$, $S \leq 0.005$, Cu is 0.01 to 0.20, Mo is 4.80 to 5.20, Ni is 17.5 to 18.5, Cr is 0.01 to 0.20, Ti is 1.80 to 1.95, Co is 14.0 to 15.5, Al is 0.05 to 0.15, with the remainder being Fe and contaminants resulting from the manufacturing process.

Obtaining the alloy properties required under stringent consumer specifications requires careful and strict control of the alloying composition and forming processes. Even slight adjustments in processing of alloy compositions can significantly affect properties and performance of maraging steels. Due in part to these requirements, extensive efforts have been made to improve the mechanical properties of maraging alloys for various applications. For example, attempts to increase the yield strength and resistance to projectile penetration in maraging alloys have focused on alloy forming methods over a wide range of process parameters, including furnace time and temperature, annealing and age hardening temperatures, rolling operations, and the like. Reported methods use various processing conditions in an attempt to provide improved alloy properties to the maraging material.

Further improvements would be a welcome addition to the prior art processes in which control and monitoring of alloying elements and processing conditions are intended to improve the characteristics of maraging steels. More particularly, there is a continued need for approaches improving the yield strength in maraging steels and providing greater integrity, physical properties, and/or resistance to projectile penetration in the articles formed therefrom.

SUMMARY

In one embodiment, the present invention provides a maraging steel composition, comprising, by weight, 15.0 to 20.0% Ni, 2.0 to 6.0% Mo, 3.0 to 8.0% Ti, up to 0.5% Al, the balance Fe and residual impurities.

In another embodiment, the present invention provides a plate of maraging steel, comprising a first layer formed of a composition comprising, by weight, 15.0 to 20.0% Ni, 2.0 to 6.0% Mo, 3.0 to 8.0% Ti, up to 0.5% Al, the balance Fe and residual impurities. The plate may be a composite having a second layer deposited on the first layer, the second layer having a composition comprising, by weight, 15.0 to 20.0% Ni, 2.0 to 6.0% Mo, 1.0 to 3.0 Ti, up to 0.5% Al, the balance Fe and residual impurities.

In yet another embodiment, the present invention provides a composite plate of maraging steel comprising a first layer and a second layer, the first layer having a hardness value ranging from 58 to 64 RC, the second layer having a hardness value ranging from 48 to 54 RC.

The present invention also provides a method of forming a maraging steel. The method comprises producing steel with a composition comprising, by weight, 15.0 to 20.0% Ni, 2.0 to 6.0% Mo, 3.0 to 8.0% Ti, up to 0.5% Al, the balance Fe and residual impurities.

In another embodiment, the present invention provides a method of forming a plate of maraging steel. The method comprises producing steel of a first layer formed of a composition comprising, by weight, 15.0 to 20.0% Ni, 2.0 to 6.0% Mo, 3.0 to 8.0% Ti, up to 0.5% Al, the balance Fe and residual impurities, and forming the first layer into the plate of maraging steel. In embodiments where the plate is a composite plate, the method may further comprise producing steel of a second layer formed of a composition comprising, by weight, 15.0 to 20.0% Ni, 2.0 to 6.0% Mo, 1.0 to 3.0 Ti, up to 0.5% Al, the balance Fe and residual impurities, and forming the first layer and the second layer into the composite plate.

In yet another embodiment, the present invention provides a method of forming a plate of maraging steel. The method includes producing steel of a first layer formed of a composition having a hardness value ranging from 58 to 64 RC, and producing steel of a second layer formed of a composition having a hardness value ranging from 48 to 54 RC.

The present invention also provides a method of forming a composite plate of maraging steel. The method comprises: producing steel of a first layer, the first layer produced using powdered metallurgy; producing steel of a second layer formed of a composition; and forming the first layer and the second layer into the composite plate.

The present invention also provides articles of manufacture formed by the steel compositions, plates, and methods set forth above.

It should be understood that this invention is not limited to the embodiments disclosed in this summary, but it is intended to cover modifications that are within the spirit and scope of the invention, as defined by the claims.

DETAILED DESCRIPTION

It is to be understood that certain descriptions of the present invention have been simplified to illustrate only those elements and limitations that are relevant to a clear understanding of the present invention, while eliminating, for purposes of clarity, other elements. Those of ordinary skill in the art, upon considering the present description of the invention, will recognize that other elements and/or limitations may be desirable in order to implement the present invention. However, because such other elements and/or limitations may be readily ascertained by one of ordinary skill upon considering the present description of the invention, and are not necessary for a complete understanding of the present invention, a discussion of such elements and limitations is not provided herein. For example, as discussed herein, certain embodiments of the steels of the present invention may be used in, for example, high performance armor plate applications as applied, for example, to armored vehicles. The manner of manufacturing armor plate, for example, as applied to armored vehicles, is generally understood by those of ordinary skill in the art and, accordingly, is not described in detail herein. As such, it is to be understood that the description set forth herein is merely exemplary to the present invention and it not intended to limit the scope of the claims.

Furthermore, certain compositions within the present invention are generally described in the form of alloys that may be used to produce certain high performance components and articles, such as parts or components for armor plate applications. It will be understood, however, that the present invention may be embodied in forms and applied to end uses that are not specifically and expressly described herein. For example, one skilled in the art will appreciate that embodiments of the present invention may be incorporated into other high performance articles. Non-exhaustive examples of such other high performance articles include missile cases, centrifuge rotors, aircraft forgings, such as aircraft and airframe parts, couplings, punches and dies, rocket components and rocket motors, gas turbine engines, industrial land-based turbines, internal combustion engines, automobile and motorcycle components, automotive racing parts (such as, for example, valves, springs, bolts, and brakes), heat exchangers, equipment employed in the chemical and petrochemical industries, such as, for example, tanks, pipes, valves, pumps, and the like, biomedical implant components, surgical instruments, recreational equipment, sports equipment, architectural components, and building materials.

Unless otherwise expressly specified, all of the numerical ranges, amounts, values and percentages, such as those for amounts of materials, elemental contents, times and temperatures of reaction, ratios of amounts, and others, in the following portion of the specification and attached claims may be read as if prefaced by the word "about" even though the term "about" may not expressly appear with the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values are reported as precisely as possible. Any numerical value, however, inherently contains error necessarily resulting from the standard deviation found in its underlying respective testing measurements. Furthermore, when numerical ranges are set forth herein, these ranges are inclusive of the recited range end points (i.e., end points may be used). When percentages by weight are used herein, the numerical values reported are relative to the total alloy weight. Also, unless expressly indicated otherwise, when weight percentages are provided herein for components of the steels of the present invention, the percentages provided are based on the elemental form of each component.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The teachings of the present invention may be useful both in a dual hardness composite steel armor plate as well as a homogenous steel plate. As used herein, the term "homogenous plate" is meant to be a single plate made from single melt or powder composition, as compared to a "composite plate" (i.e. two or more plates or layers separately formed and joined together to form a plate). Accordingly, the first and second layers set forth below may be employed alone for various uses, or may be used in one or more layered arrangements as a composite steel armor plate. The term "source" means any material suitable for use as an ingredient to a melt or powder blend to provide a particular elemental constituent to the melt or powdered blend. As used herein, the term "residual impurities" means one or more component contents that act as incidental contaminants to the melt or powdered composition that provide no known functional purpose or benefit in the melt or powder composition. As used herein, the phrase "deposited on" or "applied to" a plate or layer means deposited or provided above or over, but not necessarily adjacent to, the surface of the plate or layer. For example, a first layer can be deposited directly on the second layer or one or more other layers can be applied therebetween. Also, when the term "a," "an," or "the" is employed herein to refer to an article, at least one, and, possibly, more than one article is contemplated, and may be employed or used.

The present invention is directed, generally, to high strength steels, and particularly to maraging steels and methods of making and employing the same. Certain of the maraging steels within the present invention would have application in, for example, high performance components as set forth herein. It has been found that the addition of effective amounts of nickel, titanium, and molybdenum, along with other optional additives, as set forth herein, to form maraging steels provides high performance properties, such as, for example, hardness, to the processed ingots and the resultant articles formed therefrom, such as armor plate. For example, the inventors have determined that a dual hardness armor plate having a first layer having particular chemistries that provide a first hardness within a first hardness range, and a second layer having particular chemistries that provide a second hardness greater than the first hardness within a second hardness range, that may be formed by certain hardening and processing operations, can produce significant high performance properties, such as excellent ballistic performance, when compared to prior art maraging steels. In one embodiment, the first layer may be a front side and the second layer may be a back side of the armor plate.

A wide range of maraging steels falling within the claimed ranges and forming methods, and designed to operate over a significant range of hardness values, provide particular advantages in high performance articles. It has been found that the hardness values may be obtained from maraging steels as Ni—Ti—Mo materials that may be a combination of components at particular processing conditions, as set forth herein.

The materials that form the first layer may include components of iron, nickel, molybdenum, and titanium, as major components, and may, but need not, include one or more components of carbon, manganese, phosphorus, sulfur, silicon, chromium, aluminum, copper, niobium (i.e., columbium), nitrogen, and cobalt as either minor components or as residual impurities.

The major components of the first layer may be mixed such that the nickel component may be present in amounts ranging from 15.0 to 20.0 wt % of the final composition of the first layer, and may range in amounts from 18.0 to 19.0 wt %. Various forms or sources of nickel may be employed, such as electrolytic nickel, commercially available from International Nickel Company, Canada. Refined forms of nickel and nickel pellets may also be employed. The titanium component may be present in amounts ranging from 1.0 to 3.0 wt % of the final composition of the first layer, and may range in amounts from 1.35 to 1.45 wt %. The sources of the titanium component may include, for example, titanium scrap, such as Ti-6Al-4V as alloyed titanium, or commercially pure titanium additions. The molybdenum component may be present in amounts ranging from 2.0 to 6.0 wt % of the final composition of the first layer, and may range in amounts from 2.90 to 3.10 wt %. The sources of the molybdenum component may include, for example, molybdenum scrap, wire, or $MoO_2$.

The aluminum component may be added to the major components in the first layer in amounts ranging from up to 0.5 wt % of the final composition of the first layer, and may range in amounts from up to 0.1 wt %. The aluminum component may be added through various sources known in the art, such as, for example, through aluminum metal addition. Other components may, but need not, be present in the composition of the first layer maraging steel, and may include carbon, manganese, phosphorus, sulfur, silicon, chromium, copper, niobium, nitrogen, and/or cobalt. Each of these components may be present as a residual impurity or contaminant in the alloy composition. For example, the carbon component may be present in amounts ranging from up to 0.05 wt % of the final composition of the first layer, and may range in amounts from up to 0.02 wt %. The manganese component may be present in amounts ranging from up to 0.3 wt % of the final composition of the first layer, and may range in amounts from up to 0.1 wt %. The phosphorus component may be present in amounts ranging from up to 0.1 wt % of the final composition of the first layer, and may range in amounts from up to 0.04 wt %. The sulfur component may be present in amounts ranging from up to 0.03 wt % of the final composition of the first layer, and may range in amounts from up to 0.005 wt %. The silicon component may be present in amounts ranging from up to 0.5 wt % of the final composition of the first layer, and may range in amounts from up to 0.1 wt %. The chromium component may be present in amounts ranging from up to 1.0 wt % of the final composition of the first layer, and may range in amounts from up to 0.5 wt %. The copper component may be present in amounts ranging from up to 1.0 wt % of the final composition of the first layer, and may range in amounts from up to 0.2 wt %. The niobium component may be present in amounts ranging from up to 0.3 wt % of the final composition of the first layer, and may range in amounts from up to 0.15 wt %. The nitrogen component may be present in amounts ranging from up to 0.01 wt % of the final composition of the first layer, and may range in amounts from up to 0.005 wt %. The cobalt component may be present in amounts ranging from up to 0.5 wt % of the final composition of the first layer, and may range in amounts from 0.001 to 0.5 wt %.

The iron component and other trace impurities resulting from the manufacturing operation may make up the balance of the final composition of the first layer. Some sources of the iron component include, for example, iron punchings, scrap, and trim materials from mild steel.

In one embodiment of the present invention, the first layer may be a commercially available maraging steel, sold under the trademark VascoMax® T-250 from Allegheny Technologies Inc., Pittsburgh, Pa.

The materials that form the second layer may include components of iron, nickel, molybdenum, and titanium, as major components, and may, but need not, include one or more components of carbon, manganese, phosphorus, sulfur, silicon, chromium, aluminum, copper, niobium, nitrogen, and cobalt as either minor components or as residual impurities. The sources of the major components of the second layer may be the same or different from the forms and sources set forth above for the first layer, and is within the knowledge of one of ordinary skill in the art.

The major components of the second layer may be mixed such that the nickel component may be present in amounts ranging from 15.0 to 20.0 wt % of the final composition of the second layer, and may range in amounts from 18.0 to 19.0 wt %. The titanium component may be present in amounts ranging from 3.0 to 8.0 wt % of the final composition of the second layer, and may range in amounts from 5.9 to 6.3 wt %. The molybdenum component may be present in amounts ranging from 2.0 to 6.0 wt % of the final composition of the second layer, and may range in amounts from 3.9 to 4.1 wt %.

The aluminum component may be added to the major components in the second layer in amounts ranging from up to 0.5 wt % of the final composition, and may range in amounts from 0.05 to 0.10 wt %. Other components may, but need not, be present in the composition of the second layer maraging steel and may include carbon, manganese, phosphorus, sulfur, silicon, chromium, copper, niobium, nitrogen, and/or cobalt. Each of these components may be present as a residual impurity or contaminant in the alloy composition. For example, the carbon component may be present in amounts ranging from up to 0.05 wt % of the final composition of the second layer, and may range in amounts from up to 0.02 wt %. The manganese component may be present in amounts ranging from up to 0.3 wt % of the final composition of the second layer, and may range in amounts from up to 0.1 wt %. The phosphorus component may be present in amounts ranging from up to 0.04 wt % of the final composition of the second layer, and may range in amounts from up to 0.01 wt %. The sulfur component may be present in amounts ranging from up to 0.03 wt % of the final composition of the second layer, and may range in amounts from up to 0.01 wt %. The silicon component may be present in amounts ranging from up to 0.5 wt % of the final composition of the second layer, and may range in amounts from up to 0.1%. The chromium component may be present in amounts ranging from up to 1.0 wt % of the final composition of the second layer, and may range in amounts from up to 0.5 wt %. The copper component may be present in amounts ranging from up to 1.0 wt % of the final composition of the second layer, and may range in amounts from up to 0.2 wt %. The niobium component may be present in amounts ranging from up to 0.3 wt % of the final composition of the second layer, and may range in amounts from up to 0.15 wt %. The nitrogen component may be present in amounts ranging from up to 0.01 wt % of the final composition of the second layer, and may range in amounts from up to 0.007 wt %. The cobalt component may be present in amounts ranging from up to 0.5 wt % of the final composition of the second layer, and may range in amounts from 0.001 to 0.5 wt %.

The iron component and other trace impurities resulting from the manufacturing operation may make up the balance of the final composition of the first layer.

It will be appreciated by one of ordinary skill in the art that although specific oxides for each metal component may be discussed herein, other suitable compounds, such as oxides or carbonates, if applicable, may be used to form the alloy materials of the present invention. Accordingly, although particular metal oxides may be disclosed herein, one of skill in the art would understand that the present invention need not be limited to the use of the specific oxidation state identified, and other metal oxides of other oxidation states or their carbonates may be employed as a partial or complete substitute for the particular metal oxide. For example, with respect to molybdenum oxide, the present invention may employ $MoO_2$, $MoO_3$, $Mo_2O_3$, and compounds capable of being converted into $MoO_2$, $MoO_3$, and $Mo_2O_3$. Accordingly, although specific metal oxides may be employed in the present invention, one of ordinary skill in the art will understand that the scope of the present invention need not be limited to only these specific components.

With regard to preparing the melt or powdered form, the iron, nickel, titanium, molybdenum, and, optionally, aluminum components of the first and/or second layer, if necessary, may be pulverized and mixed in any manner known to those of ordinary skill in the art. The raw ore may be pulverized, such as through crushing or shearing, and mixed such that all alloying agents are present in the desired amounts and ratios. Also, through appropriate selection of ingredients, other elements such as carbon, manganese, phosphorus, sulfur, silicon, chromium, copper, niobium, nitrogen, and cobalt may be held to acceptable levels to obtain desired mechanical properties or to limit any adverse effect on the mechanical properties of the final alloy. The raw material may be blended together in powdered form or in preparation for melting. When melted, the raw ingredients may be consolidated into a generally homogenous cylindrical or rectangular form via a series of manufacturing and melting processes. As discussed above, the selection and addition of each of the raw ingredients to form the melt must be carefully controlled because of the effect these additions have on the properties of the alloy in the finished form.

Metal powder of, for example, the second layer composition may also be produced by vacuum induction melting (VIM), pouring the molten metal stream onto an atomizer, in the form of a spinning blade, which causes molten metal droplets to be created. The droplets may rapidly solidify in a vacuum or inert gas atmosphere, resulting in metal powder particles being formed.

One or more plates or layers of the armor plate of the present invention, such as those having the composition of the first layer, may be produced by conventional melt practices, such as consumable melting, (e.g., vacuum arc remelting (VAR), VIM, or electro-slag remelting (ESR)), non-consumable melting (e.g., non-consumable electric arc, plasma cold hearth melting, or electron beam cold hearth melting), or a combination of any of these practices. When applied to the composition of the first layer, for example, the method may include melting the appropriate steel composition of the first layer, casting the composition of the first layer into ingots or slabs, and hot rolling the first layer to an intermediate slab thickness. Thereafter, the first layer would be produced by grinding and cleaning the mating surface of the slab. When producing the composite plate of the present invention, the second layer may be deposited either directly or indirectly on the mating surface of the first layer and roll bonded such that the layers form a strong metallurgical bond therebetween. The second layer may be in powdered form, and applied to the first layer as described in more detail below, or may be formed employing conventional melting practices, in a manner similar to the first layer. In this latter form, the first and second slabs may be formed into a composite in a manner known to those skilled in the art, such as set forth in U.S. Pat. Nos. 5,749,140 and 6,360,936, which are incorporated herein by reference in their entirety, with possible process variation as set forth herein. For example, the first and second slabs may undergo peripheral welding or explosive cladding to form packs on the front and rear slabs, and thereafter rolling the two or more steels, such as through a roll-bonding process, to a desired plate thickness. The welded slab product may, but not necessarily, be evacuated and hermetically sealed with high vacuum for subsequent roll-bonding to a desired plate thickness. Thereafter, the slab may undergo heat treatment by austenitizing, quenching, and tempering, as necessary.

In embodiments where the second layer is deposited on the mating surface of the first plate layer in powdered form, the composite slab may be formed by the various powdered metallurgy techniques. In one embodiment, for example, the second layer may be applied to the mating surface of the first layer in any desired amount, such as those set forth herein, by hot isostatic pressing to any desired thickness. Thereafter, the composite slab may be roll-bonded to the desired plate thickness and subsequently heat treated by austenitizing, quenching, and tempering as necessary. For example, in one embodiment employing powder metallurgy techniques, the product of the present invention may be produced by hot rolling an ingot of the first layer (backside) composition to form a slab, smooth grinding the surface of the slab, and hot isostatically pressing metal powder of the second layer (front side) composition against the backside slab. The composite slab may then be heated in the range of 1900 to 2300° F. (1038 to 1260° C.), such as 2150° F. (1177° C.) to an intermediate slab size ranging from 2 to 20 times, such as 10 times, the finish thickness. The slab may then be cooled and blasted, and thereafter heated to a temperature ranging from 1600 to 2100°

F. (871 to 1149° C.), such as 1850° F. (1010° C.). The slab may then be rolled to finish size, annealed at a temperature ranging from 1650 to 1750° F. (899 to 954° C.), such as 1700° F. (927° C.), cooled below 100° F. (38° C.), annealed at a temperature ranging from 1450 to 1550° F. (788 to 843° C.), such as 1500° F. (816° C.), blasted and then cut to size.

In embodiments of the present invention, the first (soft side) layer may be in the range of 40 to 50% by weight of the total composite, and may be 45% by weight of the total composite, while the second (hard side) layer may be in the range of 50 to 60% by weight of the total composite, and may be 55% by weight of the total composite. In this form, when the composite is heat treated, distortion of the composite is at a minimum.

The first (soft side) layer may be formed to any desire thickness, such as to a thickness ranging from 2.0 to 8.0 inches, and may be formed to a thickness of 5.0 inches. The second (hard side) layer may be formed using powdered metallurgy techniques, as set forth herein, and may be formed directly or indirectly adjacent to the first layer to any desired thickness, such as to a thickness ranging from 1.5 to 6.0 inches, and may be formed to a thickness of 4.1 inches. In embodiments where the composite slab includes only a first and second layer, the composite slab may be formed to any desired thickness, such as a thickness ranging from 3.5 to 14 inches, and may be formed to a thickness of 9.0 inches.

In one embodiment, the first (soft side) layer may have a hardness value, measured on the Rockwell hardness scale C ("RC"), ranging from 48 to 54 RC, and may have a hardness value ranging from 49 to 51 RC. The hardness value of the first layer may be reached after age hardening the first layer at a temperature ranging from 850° F. to 1000° F., and may be reached after age hardening the first layer at a temperature of 925° F. The second (hard side) layer may have a hardness value ranging from 58 to 64 RC, and may have a hardness value ranging from 59 to 61 RC. The harness value of the second layer may be reached after age hardening the second layer at a temperature ranging from 850° F. to 1000° F., and may be reached after age hardening the second layer at a temperature of 925° F. In some embodiments of the present invention, the tensile strength of the second layer should be at least 350 ksi to achieve these relatively high hardness values.

The remelting and casting into the finished shape for secondary fabrication are thereafter completed as known to those of ordinary skill in the art. The final ingot may be converted by hot working, e.g., forging or rolling at elevated temperatures, annealed, and age hardened to a size than can be used to produce a desired final product. For example, the ingot may be annealed at 1500° F. and age hardened at 925° F. for six hours to determine properties of the composition. The hot working operation changes the physical shape and the internal structure of the alloy to impart the desired physical properties to the material.

As illustrated in the examples provided herein, it has been found that maraging steel compositions and forming methods of the present invention can provide an dual hardness armor plate that is precipitation hardenable and exhibits reduced or substantially no distortion properties during the hardening process, such as during the oil quenching step of the hardening operation that occurs with low alloy steels. In embodiments of the dual hardness armor plate of the present invention, the armor plate may distort less than existing armor plate during cooling after hot rolling. Although some distortion may occur in the dual armor plate of the present invention after rolling due to differences in transformation temperatures between the first and second layer, once flattened, the dual armor plate will remain substantially flat during precipitation hardening, using, for example, an external heat treatment apparatus.

It is anticipated that the ballistic performance of embodiments of the present invention would be superior to existing armor plate formed of Ni—Cr—Mo alloy steels, and will exhibit superior toughness properties. In addition, when formed as a dual harness armor plate, embodiments of the present invention may replace some homogenous armor plate due to superior and more consistent ballistic performance. Embodiments of the present invention, when applied to articles, such as armored vehicles, also may exhibit one or more of superior ballistic performance, lower weight, easier assembly, greater reliability, and multiple hit capacity when compared to existing armor plate, such as homogenous armor plate.

It will be appreciated by those of ordinary skill in the art that the improved characteristics of the alloys of the present invention would be expected to provide superior distortion characteristics and toughness properties when fashioned into billets that may lead to production of larger panels for use in certain high performance products. Embodiments of the present invention, when applied to articles, such as armored vehicles, also may exhibit one or more of superior ballistic performance, lower weight, easier assembly, greater reliability, and multiple hit capacity when compared to existing armor plate, such as homogenous armor plate. It will also be appreciated by those skilled in the art that changes could be made to the embodiments described herein without departing from the broad concept of the invention. It is understood, therefore, that this invention is not limited to the particular embodiments disclosed, but is intended to cover modifications that are within the spirit and scope of the invention, as defined by the claims.

What is claimed is:

1. A method of forming a composite plate of maraging steel, the method comprising:
   depositing a layer comprising a first maraging steel powder onto a surface of a slab comprising a second maraging steel;
   the first maraging steel having a hardness value ranging from 58 to 64 RC, a tensile strength of at least 350 ksi, and a composition comprising, by weight, 15.0% to 20.0% Ni, 2.0% to 6.0% Mo, 3.0% to 8.0% Ti, up to 0.5% Al, up to 0.5% Co, the balance Fe and residual impurities; and
   the second maraging steel having a hardness value ranging from 48 to 54 RC and a composition comprising, by weight, 15.0% to 20.0% Ni, 2.0% to 6.0% Mo, 1.0% to 3.0% Ti, up to 0.5% Al, the balance Fe and residual impurities;
   hot isostatic pressing the deposited layer comprising the first maraging steel powder onto the slab comprising the second maraging steel to form an intermediate composite slab; and
   roll-bonding the intermediate composite slab to form the composite plate.

2. The method of claim 1, wherein roll-bonding the intermediate composite slab comprises:
   heating the intermediate composite slab at a temperature in the range of 1900° F. to 2300° F.; and
   hot rolling the intermediate composite slab.

3. The method of claim 1, wherein roll-bonding the intermediate composite slab comprises:
   heating the intermediate composite slab at a temperature in the range of 1600° F. to 2100° F.; and
   hot rolling the intermediate composite slab.

4. The method of claim 1, further comprising annealing the composite plate at a temperature ranging from 1650° F. to 1750° F.

5. The method of claim 1, further comprising annealing the composite plate at a temperature ranging from 1450° F. to 1550° F.

6. The method of claim 1, wherein roll-bonding the intermediate composite slab comprises:
heating the intermediate composite slab at a temperature in the range of 1900° F. to 2300° F.;
hot rolling the intermediate composite slab to an intermediate composite plate;
heating the intermediate composite plate at a temperature in the range of 1600° F. to 2100° F.;
hot rolling the intermediate composite plate to a finish composite plate;
annealing the finish composite plate at a temperature ranging from 1650° F. to 1750° F.;
cooling the finish composite plate to a temperature less than 100° F.; and
annealing the finish composite plate at a temperature ranging from 1450° F. to 1550° F.

7. The method of claim 1, further comprising age hardening the composite plate at a temperature ranging from 850° F. to 1000° F.

8. The method of claim 1, wherein the first maraging steel comprises 5.9% to 8.0% Ti.

9. The method of claim 1, wherein the first maraging steel comprises 18.0% to 19.0% Ni, 3.9% to 4.1% Mo, 5.9% to 6.3% Ti, and 0.05% to 0.1% Al.

10. The method of claim 1, wherein the second maraging steel comprises 18.0% to 19.0% Ni, 2.9% to 3.1% Mo, and 1.35% to 1.45% Ti.

11. The method of claim 1, wherein the hardness value of the first maraging steel ranges from 59 to 61 RC, and the hardness value of the second maraging steel ranges from 49 to 51 RC.

12. A composite plate formed by the method of claim 1, wherein the first maraging steel comprises from 50% to 60% of the composite plate by weight, and the second maraging steel comprises from 40% to 50% of the composite plate by weight.

13. A composite plate formed by the method of claim 1, wherein the plate comprises a layer of the first maraging steel having a thickness of 1.5 inch to 6.0 inch, and a layer of the second maraging steel having a thickness of 2.0 inch to 8.0 inch.

14. A method of forming a composite plate, the method comprising:
depositing a first layer comprising a maraging steel to a second layer comprising a different alloy, the maraging steel having a composition comprising, by weight, 15.0% to 20.0% Ni, 2.0% to 6.0% Mo, 3.0% to 8.0% Ti, up to 0.5% Al, up to 0.5% Co, the balance Fe and residual impurities;
hot isostatic pressing the deposited first layer comprising the maraging steel powder onto the second layer; and
metallurgically bonding the first layer to the second layer to form the composite plate.

15. The method of claim 14, wherein the maraging steel has a hardness value ranging from 58 to 64 RC and a tensile strength of at least 350 ksi.

16. The method of claim 14, wherein the maraging steel has a hardness value ranging from 58 to 64 RC.

17. The method of claim 14, wherein the maraging steel has a tensile strength of at least 350 ksi.

18. The method of claim 14, wherein metallurgically bonding the first layer to the second layer comprises roll-bonding the first layer to the second layer.

19. The method of claim 14, wherein the application of the first layer to the second layer comprises a powder metallurgy technique.

20. The method of claim 14, wherein metallurgically bonding the first layer to the second layer comprises roll-bonding the first layer to the second layer.

21. The method of claim 14, further comprising annealing the composite plate at a temperature ranging from 1650° F. to 1750° F.

22. The method of claim 14, further comprising annealing the composite plate at a temperature ranging from 1450° F. to 1550° F.

23. The method of claim 14, further comprising:
annealing the composite plate at a temperature ranging from 1650° F. to 1750° F.;
cooling the composite plate to a temperature less than 100° F.; and
annealing the composite plate at a temperature ranging from 1450° F. to 1550° F.

24. The method of claim 14, further comprising age hardening the composite plate at a temperature ranging from 850° F. to 1000° F.

25. The method of claim 14, wherein the second layer comprises a second maraging steel having a composition comprising, by weight, 15.0% to 20.0% Ni, 2.0% to 6.0% Mo, 1.0% to 3.0% Ti, up to 0.5% Al, the balance Fe and residual impurities.

26. The method of claim 25, wherein the second maraging steel has a hardness value ranging from 48 to 54 RC.

27. The method of claim 25, wherein the second maraging steel comprises 18.0% to 19.0% Ni, 2.9% to 3.1% Mo, and 1.35% to 1.45% Ti.

28. The method of claim 25, wherein the maraging steel of the first layer has a hardness value ranging from 59 to 61 RC, and the second maraging steel has a hardness value ranging from 49 to 51 RC.

29. The method of claim 14, wherein the maraging steel of the first layer comprises 5.9% to 8.0% Ti.

30. The method of claim 14, wherein the maraging steel of the first layer comprises 18.0% to 19.0% Ni, 3.9% to 4.1% Mo, 5.9% to 6.3% Ti, and 0.05% to 0.1% Al.

31. A composite plate formed by the method of claim 25, wherein the maraging steel of the first layer comprises from 50% to 60% of the composite plate by weight, and the second maraging steel comprises from 40% to 50% of the composite plate by weight.

32. A composite plate formed by the method of claim 25, wherein the plate comprises a layer of first maraging steel having a thickness of 1.5 inch to 6.0 inch, and a layer of the second maraging steel having a thickness of 2.0 inch to 8.0 inch.

* * * * *